US012513363B1

(12) United States Patent
Trinh et al.

(10) Patent No.: US 12,513,363 B1
(45) Date of Patent: Dec. 30, 2025

(54) METHOD AND DEVICE FOR INTERRUPTING MEDIA PLAYBACK

(71) Applicant: Apple Inc., Cupertino, CA (US)

(72) Inventors: Jessica Trinh, Oakland, CA (US); Brian W. Temple, Santa Clara, CA (US); Eddy Zexin Liang, Seattle, WA (US); Ronald J. Guglielmone, Jr., Redwood City, CA (US)

(73) Assignee: APPLE INC., Cupertino, CA (US)

( * ) Notice: Subject to any disclaimer, the term of this patent is extended or adjusted under 35 U.S.C. 154(b) by 2 days.

(21) Appl. No.: 18/798,071

(22) Filed: Aug. 8, 2024

Related U.S. Application Data

(60) Provisional application No. 63/541,032, filed on Sep. 28, 2023.

(51) Int. Cl.
*H04N 21/44* (2011.01)
*H04N 21/2387* (2011.01)
*H04N 21/442* (2011.01)

(52) U.S. Cl.
CPC ... *H04N 21/44218* (2013.01); *H04N 21/2387* (2013.01)

(58) Field of Classification Search
CPC .............. H04N 21/44218; H04N 21/2387
See application file for complete search history.

(56) References Cited

U.S. PATENT DOCUMENTS

| | | | | |
|---|---|---|---|---|
| 9,253,455 B1 * | 2/2016 | Harrison | ............. | H04M 11/025 |
| 9,509,269 B1 * | 11/2016 | Rosenberg | ............... | H03G 3/32 |
| 10,341,742 B1 * | 7/2019 | Kim | ................... | H04N 21/4122 |
| 11,563,597 B2 * | 1/2023 | Roe | .................... | H04N 21/4394 |
| 12,100,109 B2 * | 9/2024 | Guerra Filho | ........ | G06T 19/003 |
| 12,363,380 B1 * | 7/2025 | Abdool | .............. | H04N 21/4122 |
| 12,389,086 B2 * | 8/2025 | Fay | .................. | H04N 21/42202 |
| 2007/0053653 A1 * | 3/2007 | Huntington | ............ | H04N 7/163 |
| | | | | 386/234 |
| 2009/0079822 A1 * | 3/2009 | Yoo | ........................ | G06F 3/012 |
| | | | | 348/E7.085 |
| 2011/0185312 A1 * | 7/2011 | Lanier | ................ | H04N 21/6125 |
| | | | | 715/810 |
| 2011/0280551 A1 * | 11/2011 | Sammon | .................. | H04N 5/91 |
| | | | | 386/242 |
| 2016/0227278 A1 * | 8/2016 | Bugajski | .......... | H04N 21/43615 |
| 2017/0272706 A1 * | 9/2017 | Jeong | ..................... | H04N 7/142 |
| 2018/0075720 A1 * | 3/2018 | Davies | ..................... | H04N 5/76 |
| 2018/0176274 A1 * | 6/2018 | Gomes-Casseres | .... | G06F 3/165 |

(Continued)

FOREIGN PATENT DOCUMENTS

CN 105376689 A 3/2016

*Primary Examiner* — Timothy R Newlin
(74) *Attorney, Agent, or Firm* — Fernando & Partners, LLP

(57) ABSTRACT

In some implementations, the method includes: while presenting media via a computing system, obtaining an audio sample from within a physical environment; in response to obtaining the audio sample, determining a class for the audio sample; determining a priority value for the audio sample based on the determined class for the audio sample; in response to determining that the priority value for the audio sample satisfies an interruption criterion, determining whether a user of the computing system has reacted to the audio sample; and in response to determining that the user has not reacted to the audio sample within a predefined time period, modifying the presentation of the media.

20 Claims, 8 Drawing Sheets

(56) References Cited

U.S. PATENT DOCUMENTS

| | | | |
|---|---|---|---|
| 2019/0182072 A1* | 6/2019 | Roe | H04L 12/2829 |
| 2019/0272724 A1* | 9/2019 | Greene | G08B 21/0205 |
| 2020/0073731 A1* | 3/2020 | Fish | G06F 9/546 |
| 2020/0268263 A1* | 8/2020 | Lee | A61B 5/7203 |
| 2022/0131718 A1* | 4/2022 | Aebi | G06F 3/167 |
| 2022/0133244 A1* | 5/2022 | Landwehr | G08B 21/02 |
| | | | 340/506 |
| 2022/0167049 A1* | 5/2022 | Carbune | H04N 21/47202 |
| 2022/0238091 A1* | 7/2022 | Jasleen | G10K 11/17833 |
| 2022/0394347 A1* | 12/2022 | Cheong | H04B 7/02 |

* cited by examiner

METHOD AND DEVICE FOR INTERRUPTING MEDIA PLAYBACK

CROSS-REFERENCE TO RELATED APPLICATIONS

This application claims priority to U.S. Provisional Patent App. No. 63/541,032, filed on Sep. 28, 2023, which is hereby incorporated by reference in its entirety.

TECHNICAL FIELD

The present disclosure generally relates to interrupting media playback and, in particular, to systems, methods, and devices for modifying and/or interrupting media playback when a sound is detected.

BACKGROUND

While consuming media content, such as watching a movie or listening to music, a user may have difficulty hearing a doorbell, a baby's cry, or the like. However, interrupting the media content for every sound would be detrimental to the user experience such as latent ambient noises.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
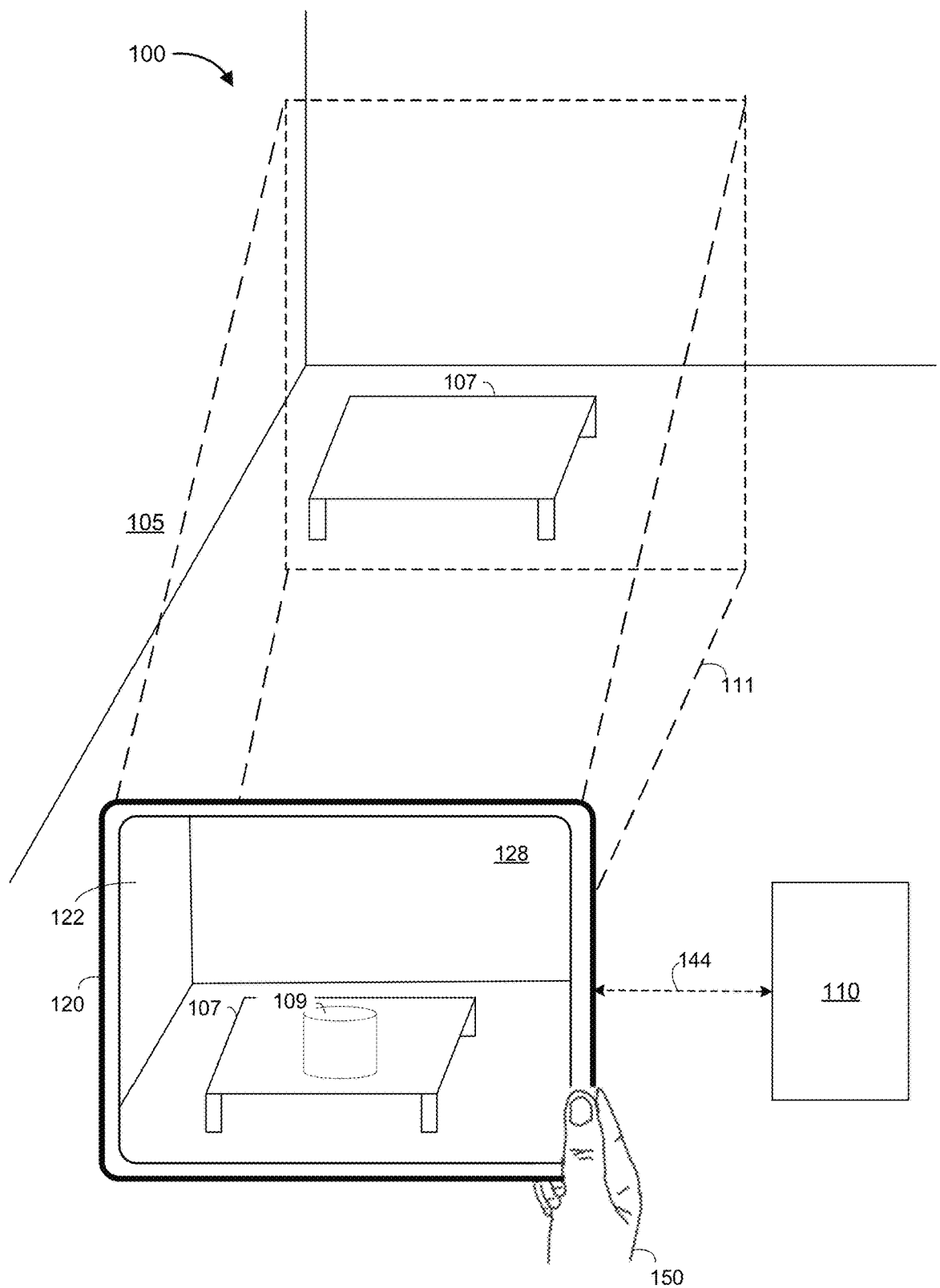
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for interrupting media playback. According to some implementations, the method is performed at a computing system including non-transitory memory and one or more processors, wherein the computing system is communicatively coupled to a display device and one or more input devices. The method includes: while presenting media via the computing system, obtaining an audio sample from within a physical environment; in response to obtaining the audio sample, determining a class for the audio sample; determining a priority value for the audio sample based on the determined class for the audio sample; in response to determining that the priority value for the audio sample satisfies an interruption criterion, determining whether a user of the computing system has reacted to the audio sample; and in response to determining that the user has not reacted to the audio sample within a predefined time period, modifying the presentation of the media.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120.

In some implementations, the controller 110 is configured to manage and coordinate an extended reality (XR) experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3. For example, the electronic device 120 corresponds to a near-eye system, mobile phone, tablet, laptop, wearable computing device, or the like.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
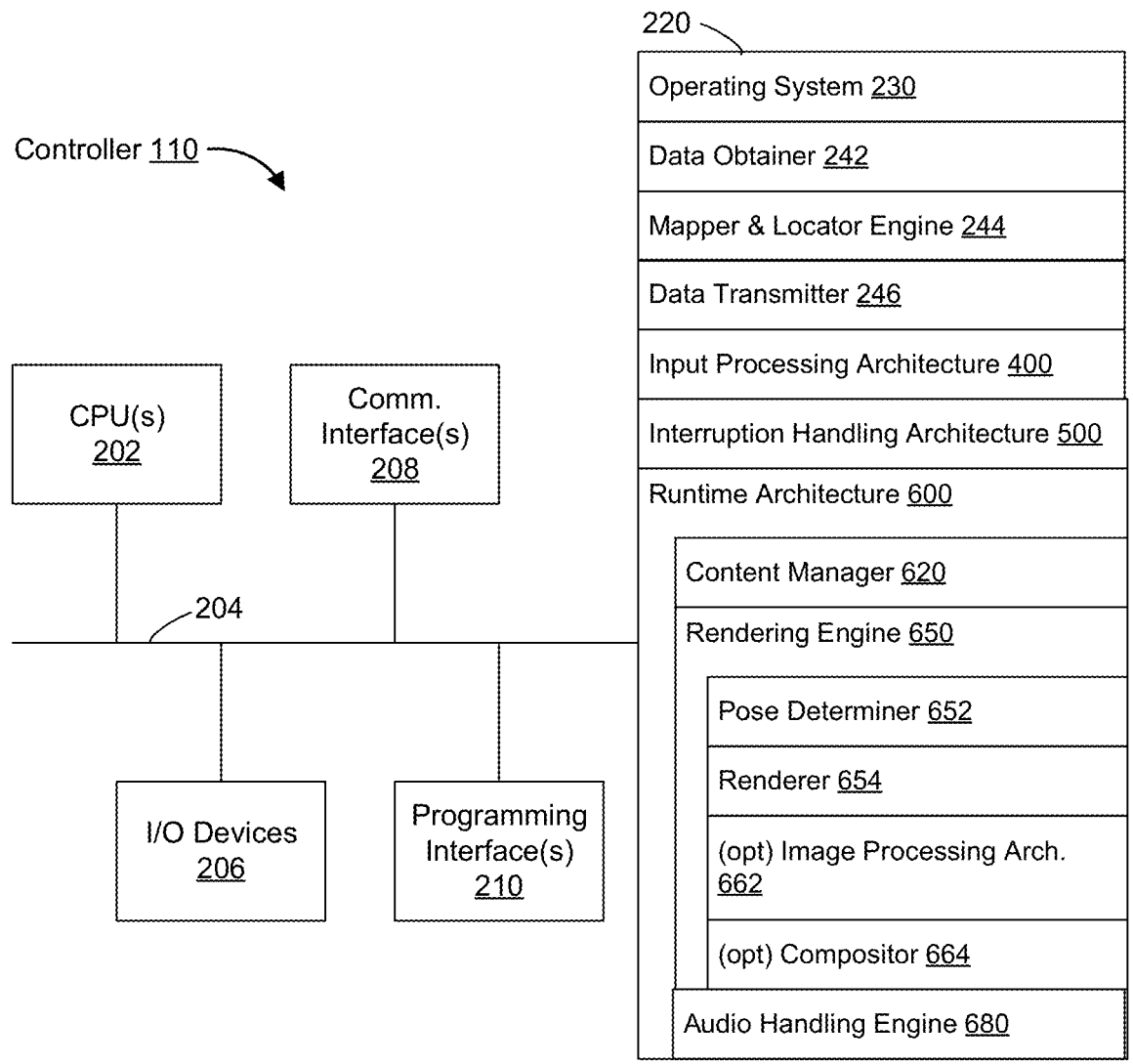
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touch-screen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 150 with respect to the physical environment 105. In some implementations, the mapper and locator engine 244 is also configured to recognize/identify objects (e.g., with semantic labels) within the physical environment 105 and track the position/location of the objects within the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, blended animation(s), etc.) to at least the electronic device 120 and optionally one or more other devices. To that end, in various implementations, the data transmitter 246 includes instructions and/or logic therefor, and heuristics and metadata therefor.

In some implementations, an input processing architecture 400 is configured to process local sensor data 403 and remote sensor data 405. The input processing architecture 400 is described in more detail below with reference to FIG. 4A. To that end, in various implementations, the input processing architecture 400 includes instructions and/or logic therefor, and heuristics and metadata therefor.

In some implementations, an interruption handling architecture 500 is configured to determine whether or not to modify media currently being presented to the user 150 (e.g., A/V content, XR content, an XR environment, or the like) based at least in part on the context information and the priority value for the one or more audio samples obtained from within the physical environment 105 during presentation of the media. The interruption handling architecture 500 is described in more detail below with reference to FIG. 5 To that end, in various implementations, the interruption handling architecture 500 includes instructions and/or logic therefor, and heuristics and metadata therefor.

In some implementations, a runtime architecture 600 is configured to manage, render, and present A/V content, XR content, an XR environment, or the like. The runtime architecture 600 is described in more detail below with reference to FIG. 6. To that end, in various implementations, the runtime architecture 600 includes instructions and/or logic therefor, and heuristics and metadata therefor. In some implementations, the runtime architecture 600 at least includes: a content manager 620, a rendering engine 650, and an audio handling engine 680.

In some implementations, the content manager 620 is configured to manage and update the audio content and visual layout, setup, structure, and/or the like for the A/V content, the XR content, the XR environment, the user interface, and/or the like during runtime. The content manager 620 is described in more detail below with reference to FIG. 6. To that end, in various implementations, the content manager 620 includes instructions and/or logic therefor, and heuristics and metadata therefor.

In some implementations, the rendering engine 650 is configured to render the A/V content, the XR content, the XR environment, the user interface, or image frame(s) associated therewith. To that end, in various implementations, the rendering engine 650 includes instructions and/or logic therefor, and heuristics and metadata therefor. In some implementations, the rendering engine 650 includes: a pose determiner 652, a renderer 654, an optional image processing architecture 662, and an optional compositor 664.

In some implementations, the pose determiner 652 is configured to determine a current camera pose of the electronic device 120 and/or the user 150 relative to the A/V content and/or XR content. The pose determiner 652 is described in more detail below with reference to FIG. 6. To that end, in various implementations, the pose determiner 652 includes instructions and/or logic therefor, and heuristics and metadata therefor.

In some implementations, the renderer 654 is configured to render the A/V content, the XR content, the XR environment, the user interface, and/or the like according to the current camera pose relative thereto. The renderer 654 is described in more detail below with reference to FIG. 6. To that end, in various implementations, the renderer 654 includes instructions and/or logic therefor, and heuristics and metadata therefor.

In some implementations, the image processing architecture 662 is configured to obtain (e.g., receive, retrieve, or capture) an image stream including one or more images of the physical environment 105 from the current camera pose of the electronic device 120 and/or the user 150. In some implementations, the image processing architecture 662 is also configured to perform one or more image processing operations on the image stream such as warping, color correction, gamma correction, sharpening, noise reduction, white balance, and/or the like. The image processing architecture 662 is described in more detail below with reference to FIG. 6. To that end, in various implementations, the image processing architecture 662 includes instructions and/or logic therefor, and heuristics and metadata therefor.

In some implementations, the compositor 664 is configured to composite the rendered A/V content and/or XR content with the processed image stream of the physical environment 105 from the image processing architecture 662 to produce rendered image frames of the XR environment for display. The compositor 664 is described in more detail below with reference to FIG. 6. To that end, in various implementations, the compositor 664 includes instructions and/or logic therefor, and heuristics and metadata therefor.

In some implementations, the audio handling engine 680 is configured to generate and/or modify an audio portion of the A/V content, the XR content, or the XR environment. The audio handling engine 680 is described in more detail below with reference to FIG. 6. To that end, in various implementations, the audio handling engine 680 includes instructions and/or logic therefor, and heuristics and metadata therefor.

Although the data obtainer 242, the mapper and locator engine 244, the data transmitter 246, the input processing architecture 400, the interruption handling architecture 500, and the runtime architecture 600 are shown as residing on a single device (e.g., the controller 110), it should be understood that in other implementations, any combination of the data obtainer 242, the mapper and locator engine 244, the data transmitter 246, the input processing architecture 400, the interruption handling architecture 500, and the runtime architecture 600 may be located in separate computing devices.

In some implementations, the functions and/or components of the controller 110 are combined with or provided by the electronic device 120 shown below in FIG. 3. Moreover, FIG. 2 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
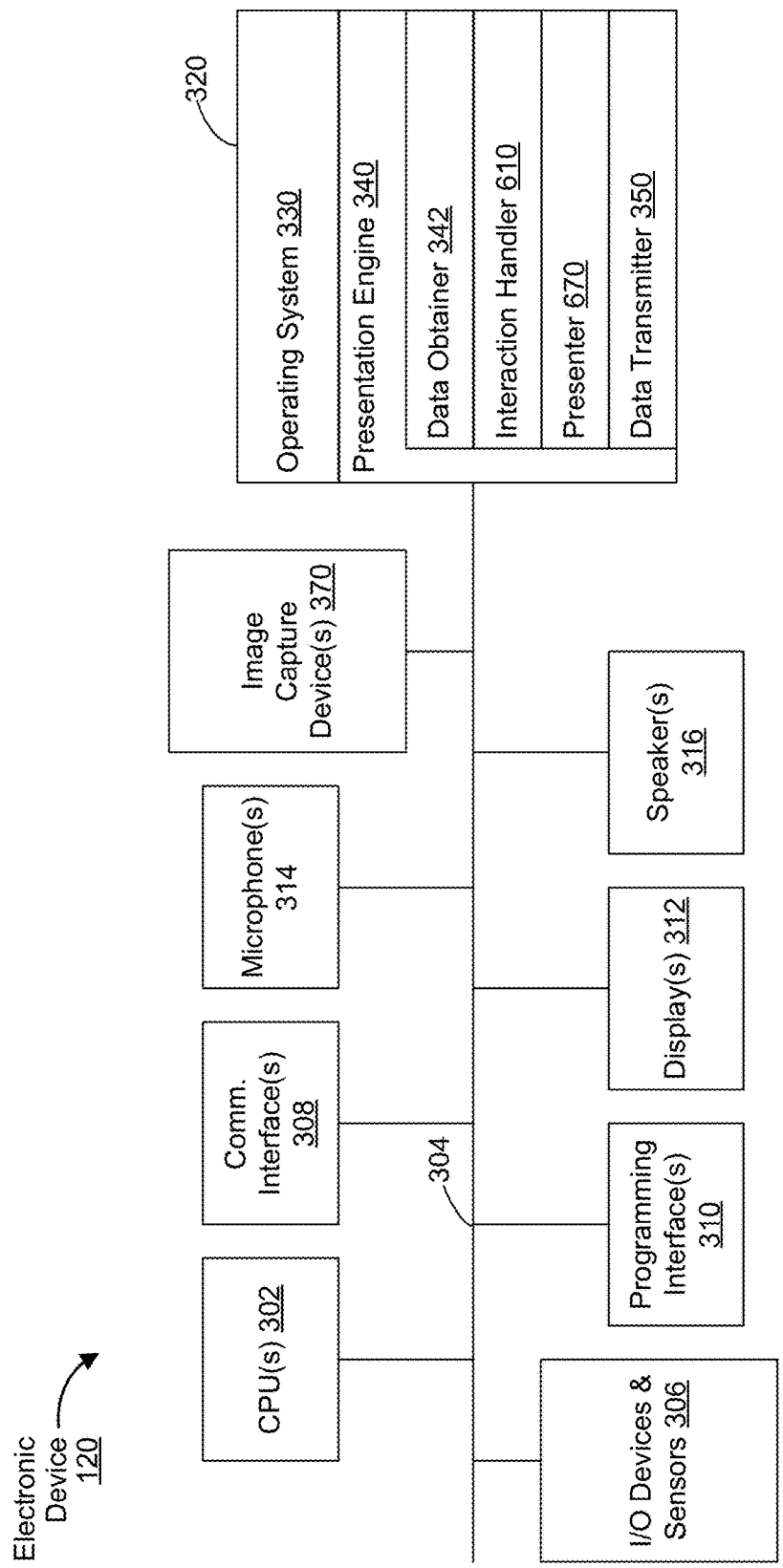
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, or the like.

In some implementations, the one or more displays 312 are configured to present the XR environment to the user 150. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more microphones 314 include a microphone array of two or more microphones with beamforming capability or the like. In some implementations, the one or more speakers 316 include a speaker array of two or more speakers capable of spatial audio playback or the like.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, an interaction handler 610, a presenter 670, and a data transmitter 350.

In some implementations, the data obtainer 342 is configured to obtain data (e.g., presentation data such as rendered image frames associated with the user interface or the XR environment, blended animation(s), input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the interaction handler 610 is configured to detect user interactions with the presented A/V content, VAs, and/or virtual content (e.g., gestural inputs detected via hand tracking, gaze inputs detected via eye tracking, voice commands, touch inputs, and/or the like). To that end, in various implementations, the interaction handler 610 includes instructions and/or logic therefor, and heuristics and metadata therefor.

In some implementations, the presenter 670 is configured to present and update the A/V content, XR content, or the XR environment (e.g., the rendered image frames associated with the A/V content, XR content, or the environment and audio associated therewith) by driving the one or more displays 312, the one or more speakers 316, one or more haptics engines, and/or the like. To that end, in various implementations, the presenter 670 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the interaction handler 610, the presenter 670, and the data transmitter 350 are shown as residing on a single device (e.g., the electronic device 120), it should be understood that in other implementations, any combination of the data obtainer 342, the interaction handler 610, the presenter 670, and the data transmitter 350 may be located in separate computing devices.

Moreover, FIG. 3 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
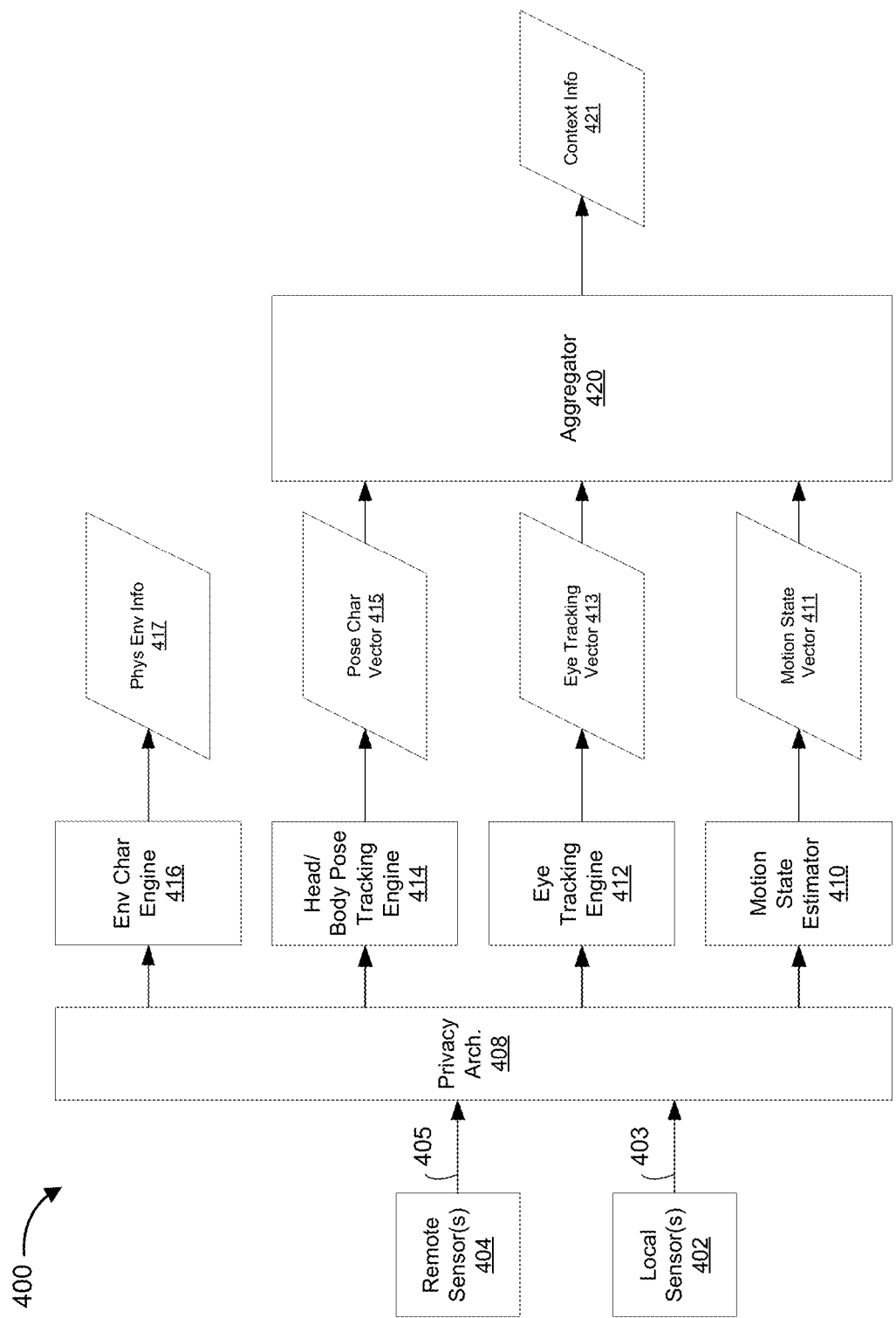
FIG. 4A is a block diagram of an example input processing architecture in accordance with some implementations.

FIG. 4A is a block diagram of an example input processing architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the input processing architecture 400 is included in a computing system with one or more processors and non-transitory memory such as the controller 110 shown in FIGS. 1 and 2; the electronic device 120 shown in FIGS. 1 and 3; and/or a suitable combination thereof.

As shown in FIG. 4A, one or more local sensors 402 of the controller 110, the electronic device 120, and/or a combination thereof obtain local sensor data 403 associated with the physical environment 105. For example, the local sensor data 403 includes motion sensor data from one or more motion sensors (e.g., an inertial measurement unit (IMU), accelerometer, gyroscope, magnetometer, etc.), audio data from one or more microphones, biosensor data from one or more biosensors, images or a stream thereof of the physical environment 105, simultaneous location and mapping (SLAM) information for the physical environment 105 and the location of the electronic device 120 or the user 150 relative to the physical environment 105, background frequency/complexity information for the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 403 includes un-processed or post-processed information. As another example, the local sensor data 403 includes operational data associated with the controller 110, the electronic device 120, and/or a combination such as the volatile memory utilization, non-volatile storage utilization, CPU utilization, bandwidth consumption, power consumption, battery life, thermal load, other onboard sensor data, and/or the like Similarly, as shown in FIG. 4A, one or more remote sensors 404 associated with the optional remote input devices within the physical environment 105 obtain remote sensor data 405 associated with the physical environment 105. For example, the remote sensor data 405 includes motion sensor data from one or more motion sensors (e.g., an IMU, accelerometer, gyroscope, magnetometer, etc.), audio data from one or more microphones, biosensor data from one or more biosensors, images or a stream thereof of the physical environment 105, SLAM information for the physical environment 105 and the location of the electronic device 120 or the user 150 relative to the physical environment 105, background frequency/complexity information for the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 405 includes un-processed or post-processed information.

According to some implementations, the privacy architecture 408 ingests the local sensor data 403 and the remote sensor data 405. In some implementations, the privacy architecture 408 includes one or more privacy filters associated with user information and/or identifying information. In some implementations, the privacy architecture 408 includes an opt-in feature where the electronic device 120 informs the user 150 as to what user information and/or identifying information is being monitored and how the user information and/or the identifying information will be used. In some implementations, the privacy architecture 408 selectively prevents and/or limits the input processing architecture 400 or portions thereof from obtaining and/or transmitting the user information. To this end, the privacy architecture 408 receives user preferences and/or selections from the user 150 in response to prompting the user 150 for the same. In some implementations, the privacy architecture 408 prevents the input processing architecture 400 from obtaining and/or transmitting the user information unless and until the privacy architecture 408 obtains informed consent from the user 150. In some implementations, the privacy architecture 408 anonymizes (e.g., scrambles, obscures, encrypts, and/or the like) certain types of user information. For example, the privacy architecture 408 receives user inputs designating which types of user information the privacy architecture 408 anonymizes. As another example, the privacy architecture 408 anonymizes certain types of user information likely to include sensitive and/or identifying information, independent of user designation (e.g., automatically).

According to some implementations, the motion state estimator 410 obtains the local sensor data 403 and the remote sensor data 505 after it has been subjected to the privacy architecture 408. In some implementations, the motion state estimator 410 obtains (e.g., receives, retrieves, or determines/generates) a motion state vector 411 based on the input data and updates the motion state vector 411 over time.

Figure 4B:
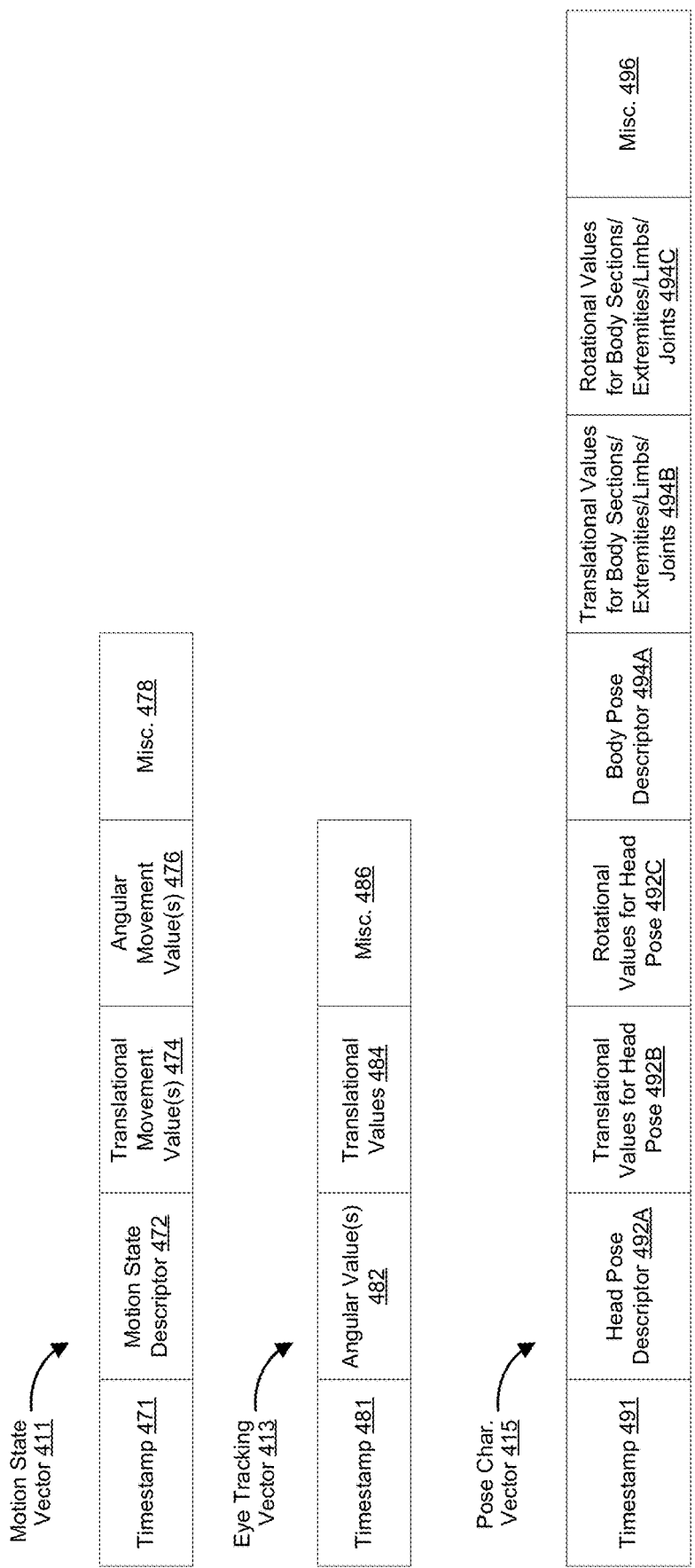
FIG. 4B illustrates data structures associated with the input processing architecture in FIG. 4A in accordance with some implementations.

FIG. 4B shows an example data structure for the motion state vector 411 in accordance with some implementations. As shown in FIG. 4B, the motion state vector 411 may correspond to an N-tuple characterization vector or characterization tensor that includes a timestamp 471 (e.g., the most recent time the motion state vector 411 was updated), a motion state descriptor 472 for the electronic device 120 (e.g., stationary, in-motion, car, boat, bus, train, plane, or the like), translational movement values 474 associated with the electronic device 120 (e.g., a heading, a velocity value, an acceleration value, etc.), angular movement values 476 associated with the electronic device 120 (e.g., an angular velocity value, an angular acceleration value, and/or the like for each of the pitch, roll, and yaw dimensions), and/or miscellaneous information 478. One of ordinary skill in the art will appreciate that the data structure for the motion state vector 411 in FIG. 4B is merely an example that may include different information portions in various other implementations and be structured in myriad ways in various other implementations.

According to some implementations, the eye tracking engine 412 obtains the local sensor data 403 and the remote sensor data 405 after it has been subjected to the privacy architecture 408. In some implementations, the eye tracking engine 412 obtains (e.g., receives, retrieves, or determines/generates) an eye tracking vector 413 (sometimes also referred to herein as the "gaze vector 413") based on the input data and updates the eye tracking vector 413 over time.

FIG. 4B shows an example data structure for the eye tracking vector 413 in accordance with some implementations. As shown in FIG. 4B, the eye tracking vector 413 may correspond to an N-tuple characterization vector or characterization tensor that includes a timestamp 481 (e.g., the most recent time the eye tracking vector 413 was updated), one or more angular values 482 for a current gaze direction (e.g., roll, pitch, and yaw values), one or more translational values 484 for the current gaze direction (e.g., x, y, and z values relative to the physical environment 105, the world-at-large, and/or the like), and/or miscellaneous information 486. One of ordinary skill in the art will appreciate that the data structure for the eye tracking vector 413 in FIG. 4B is merely an example that may include different information portions in various other implementations and be structured in myriad ways in various other implementations.

For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a region of interest (ROI) in the XR environment 128 at which the user 150 is currently looking.

According to some implementations, the head/body pose tracking engine 414 obtains the local sensor data 403 and the remote sensor data 405 after it has been subjected to the privacy architecture 408. In some implementations, the head/body pose tracking engine 414 obtains (e.g., receives, retrieves, or determines/generates) a pose characterization vector 415 based on the input data and updates the pose characterization vector 415 over time.

FIG. 4B shows an example data structure for the pose characterization vector 415 in accordance with some implementations. As shown in FIG. 4B, the pose characterization vector 415 may correspond to an N-tuple characterization vector or characterization tensor that includes a timestamp 491 (e.g., the most recent time the pose characterization vector 415 was updated), a head pose descriptor 492A (e.g., upward, downward, neutral, etc.), translational values for the head pose 492B, rotational values for the head pose 492C, a body pose descriptor 494A (e.g., standing, sitting, prone, etc.), translational values for body sections/extremities/limbs/joints 494B, rotational values for the body sections/extremities/limbs/joints 494C, and/or miscellaneous information 496. In some implementations, the pose characterization vector 415 also includes information associated with finger/hand/extremity tracking. One of ordinary skill in the art will appreciate that the data structure for the pose characterization vector 415 in FIG. 4B is merely an example that may include different information portions in various other implementations and be structured in myriad ways in various other implementations.

According to some implementations, an aggregator 420 aggregates the motion state vector 411, the eye tracking vector 413, the pose characterization vector 415, and/or the like into context information 421.

According to some implementations, the environment characterization engine 416 obtains the local sensor data 403 and the remote sensor data 405 before or after it has been subjected to the privacy architecture 408. In some implementations, the head/body pose environment characterization engine 416 obtains (e.g., receives, retrieves, or determines/generates) physical environment information 417 based on the input data and updates the physical environment information 417 over time. For example, the physical environment information 417 includes SLAM information for the physical environment 105 and the location of the electronic device 120 or the user 150 relative to the physical environment 105, background frequency information for the physical environment 105, ambient lighting information for the physical environment 105, ambient audio information for the physical environment 105, acoustic information for the physical environment 105, dimensional information for the physical environment 105 (e.g., a mesh or 3D point cloud), semantic labels for objects within the physical environment 105, and/or the like.

Figure 5:
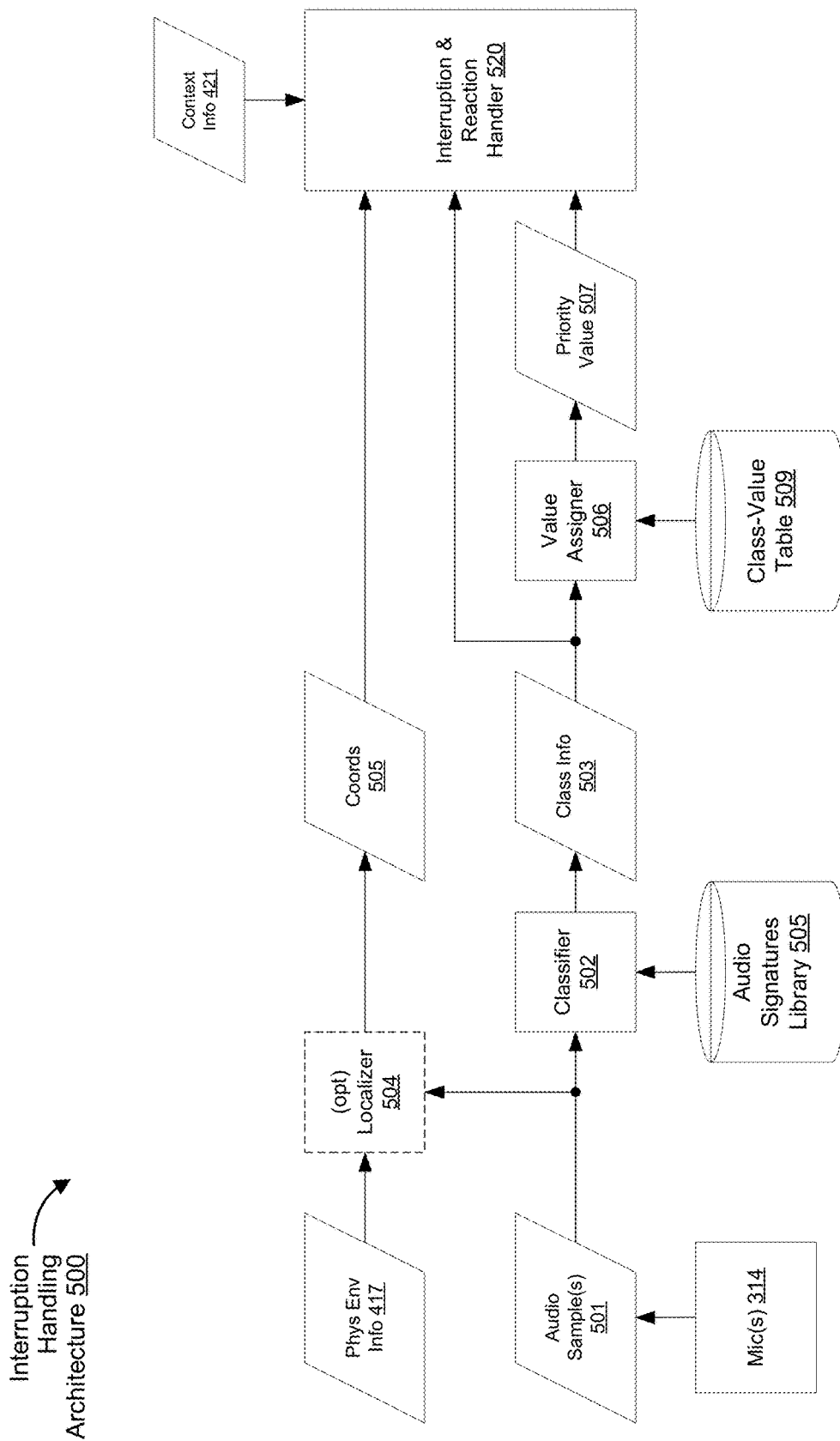
FIG. 5 is a block diagram of an example interruption handling architecture in accordance with some implementations.

FIG. 5 is a block diagram of an example interruption handling architecture 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the interruption handling architecture 500 is included in a computing system with one or more processors and non-transitory memory such as the controller 110 shown in FIGS. 1 and 2; the electronic device 120 shown in FIGS. 1 and 3; and/or a suitable combination thereof.

In some implementations, the one or more microphones 314 capture one or more audio samples 501 within the physical environment 105 such as ambient sounds, audible utterances or speech content, or the like. According to some implementations, a classifier 502 generates class information 503 (e.g., a semantic label) for the one or more audio samples 501 by matching the one or more audio samples 501 against an audio signatures library 505 including a plurality of known audio signatures and associated classes or semantic labels. One of ordinary skill in the art will appreciate that, in various other implementations, the classifier 502 may be replaced with a natural language processor, a machine learning engine (e.g., a neural network, state vector machine, or the like), or the like.

According to some implementations, a value assigner 506 determines a priority value 507 for the one or more audio samples 501 based on the class information 503 and a class-value table 509 including a plurality of predefined priority values for various classes of audio content. One of ordinary skill in the art will appreciate that the class-value table 509 may be modified and/or varied, in various implementations, based on user preferences, manual tuning inputs, crowd-sourced data, and/or the like.

According to some implementations, an optional localizer 504 generates coordinates 505 (e.g., x, y, z translational coordinates) for the one or more audio samples 501 relative to the physical environment 105 based on the physical environment information 417 or relative to the world-at-large (e.g., absolute latitudinal and longitudinal coordinates such as GPS).

According to some implementations, an interruption and reaction handler 520 determines whether or not to modify media currently being presented to the user 150 (e.g., audio, video, an XR environment, or the like) based at least in part on the context information 421 and the priority value 507 for the one or more audio samples 501 (and optionally the class information 503).

In some implementations, if the priority value 507 for the one or more audio samples 501 satisfies an interruption criterion, the interruption and reaction handler 520 determines whether the context information 421 (e.g., including a motion state, a gaze direction, head pose information, body pose information, extremity tracking information, and/or the like for the user 150) indicates that the user 150 has reacted to the one or more audio samples 501. For example, the priority value 507 for the one or more audio samples 501 satisfies the interruption criterion when the priority value 507 breaches or exceeds a deterministic or non-deterministic interruption threshold value. In this example, the computing system may set the interruption threshold value based on the media currently being presented to the user 150, a focus metric associated with how immersed or focused the user 150 is with respect to the media, a user input, and/or the like.

In some implementations, if the priority value 507 for the one or more audio samples 501 does not satisfy the interruption criterion, the interruption and reaction handler 520 forgoes determining whether the context information 421 indicates that the user 150 has reacted to the one or more audio samples 501. For example, the computing system may determine that the user 150 has reacted to the one or more audio samples 501 when the user 150 walks towards the one or more audio samples 501, turns their head towards the one or more audio samples 501, gazes towards the one or more audio samples 501, points or otherwise gestures towards the one or more audio samples 501, verbally acknowledges the one or more audio samples 501, or the like.

In some implementations, if the context information 421 indicates that the user 150 has not reacted to the one or more audio samples 501, the interruption and reaction handler 520 generates instructions for modifying the media currently being presented to the user 150 optionally based on the coordinates 505 for the one or more audio samples 501. In some implementations, if the context information 421 indicates that the user 150 has reacted to the one or more audio samples 501, the interruption and reaction handler 520 forgoes generating instructions for modifying the media currently being presented to the user 150.

For example, the instructions for modifying the media currently being presented to the user 150 may include one or more of: ducking (e.g., reducing) the volume associated with the media currently being presented to the user 150, changing spatial audio characteristics associated with the media currently being presented to the user 150 (e.g., directional ducking such as changing an origin location or panning of the audio associated with the media currently being presented to the user 150), providing a visual notification associated with the one or more audio samples 501 overlaid on the media currently being presented to the user 150, blurring or otherwise masking the media currently being presented to the user 150, providing a directional visual indicator overlaid on the media currently being presented to the user 150 based on the coordinates 505 of the one or more audio samples, providing haptic feedback, or the like.

Figure 6:
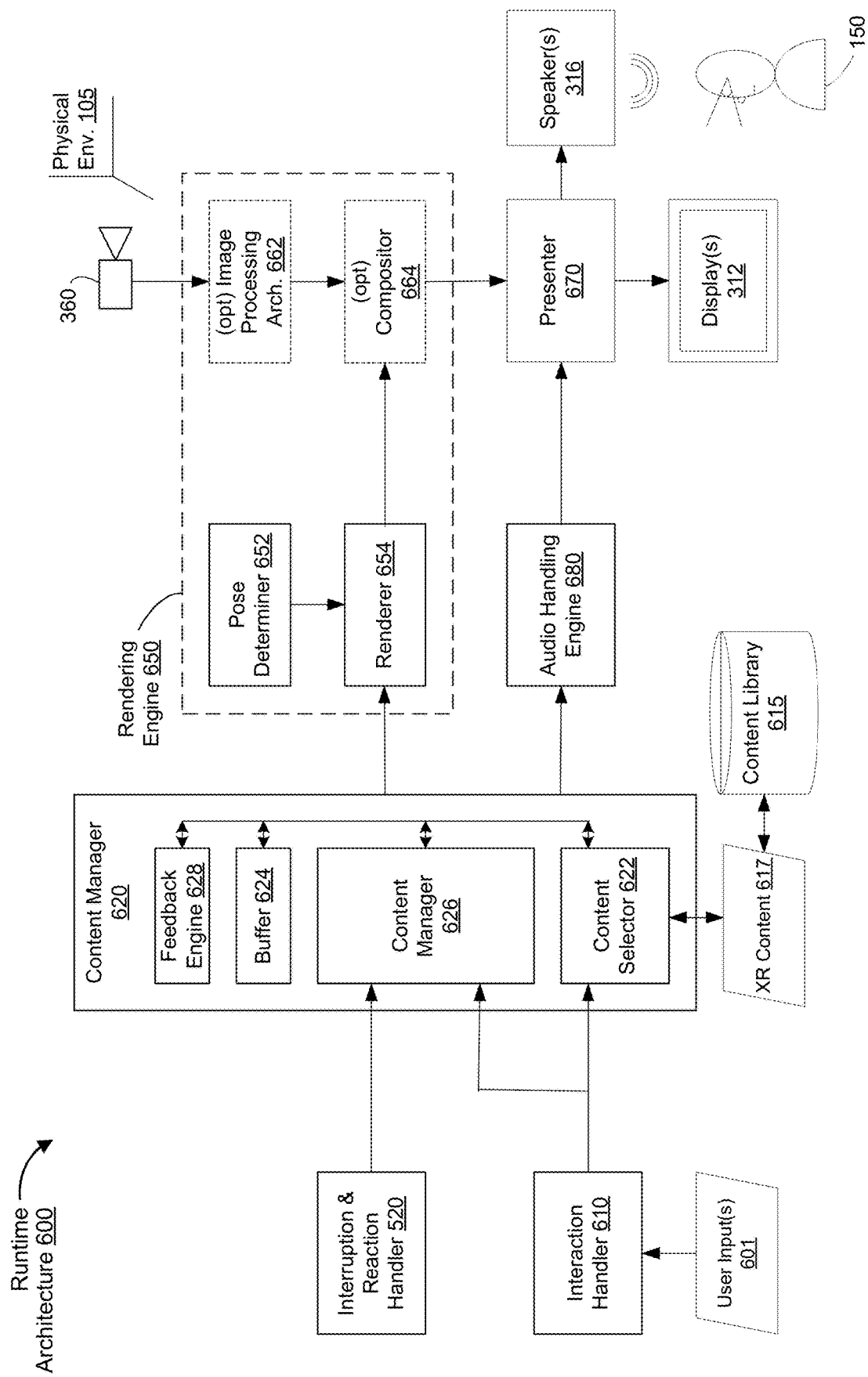
FIG. 6 is a block diagram of an example runtime architecture in accordance with some implementations.

FIG. 6 is a block diagram of an example runtime architecture 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content runtime architecture 600 is included in a computing system such as the controller 110 shown in FIGS. 1 and 2; the electronic device 120 shown in FIGS. 1 and 3; and/or a suitable combination thereof. In some implementations, the runtime architecture 600 includes software, firmware, hardware, an application-specific integrated circuit (ASIC), a field-programmable gate array (FPGA), and/or the like.

As shown in FIG. 6, the interaction handler 610 obtains (e.g., receives, retrieves, or detects) one or more user inputs 601 provided by the user 150 that are associated with selecting A/V content, XR content, and/or the like for presentation. For example, the one or more user inputs 601 correspond to a gestural input selecting XR content from a UI menu detected via hand tracking, an eye tracking input selecting XR content from the UI menu detected via eye tracking, a voice command selecting XR content from the UI menu detected via a microphone, and/or the like. In some implementations, the content selector 622 selects the XR content 617 from the content library 615 based on one or more user inputs 601 (e.g., a voice command, a selection from a menu of virtual content items and/or scenes, and/or the like). For example, the XR content 617 corresponds to a virtual agent, a virtual object, or the like within the XR environment that is animatable or otherwise enabled to translate and/or rotate.

In some implementations, the content manager 620 manages (e.g., instantiates, updates, modifies, etc.) the A/V content, the XR content, or the XR environment 128. Moreover, in some implementations, the content manager 620 modifies the A/V content, the XR content, or the XR environment 128 over time based on: translational or rotational movement of the electronic device 120 or physical objects within the physical environment 105; the one or more user inputs 601 directed to the A/V content, the XR content, or the XR environment 128 (e.g., hand/extremity tracking inputs, eye tracking inputs, touch inputs, voice commands, manipulation inputs directed to the A/V content, XR content, and/or the like); and/or the like.

According to some implementations, the feedback engine 628 generates sensory feedback (e.g., a visual notification, other visual feedback such as text or lighting changes, audio feedback, haptic feedback, etc.) associated with the A/V content, the XR content, or the XR environment 128. According to some implementations, the pose determiner 652 determines a current camera pose of the electronic device 120 and/or the user 150 relative to the XR environment 128 and/or the physical environment 105. In some implementations, the renderer 654 renders the XR content 617 within the XR environment 128 according to the current camera pose relative thereto.

According to some implementations, the optional image processing architecture 662 obtains an image stream from an image capture device 370 including one or more images of the physical environment 105 from the current camera pose of the electronic device 120 and/or the user 150. In some implementations, the image processing architecture 662 also performs one or more image processing operations on the image stream such as warping, color correction, gamma correction, sharpening, noise reduction, white balance, and/or the like. In some implementations, the optional compositor 664 composites the rendered XR content with the processed image stream of the physical environment 105 from the image processing architecture 662 to produce rendered image frames of the XR environment. In various implementations, the presenter 670 presents the rendered image frames of the XR environment to the user 150 (e.g., via the one or more displays 312 of the electronic device 120). One of ordinary skill in the art will appreciate that the optional image processing architecture 662 and the optional compositor 664 may not be applicable for fully virtual environments (or optical see-through scenarios).

According to some implementations, the audio handling engine 680 manages and updates an audio portion of the A/V content, the XR content, or the XR environment 128. In various implementations, the presenter 670 presents the audio portion of the A/V content, the XR content, or the XR environment 128 to the user 150 (e.g., via the one or more speakers 316 of the electronic device 120).

According to some implementations, as described above with reference to FIG. 5, the interruption and reaction handler 520 determines whether or not to modify media currently being presented to the user 150 (e.g., the A/V content, the XR content, the XR environment 128, or the like) based at least in part on the context information 421 and the priority value 507 for the one or more audio samples 501. In some implementations, if the priority value 507 for the one or more audio samples 501 satisfies an interruption criterion, the interruption and reaction handler 520 determines whether the context information 421 (e.g., including a motion state, a gaze direction, head pose information, body pose information, extremity tracking information, and/or the like for the user 150) indicates that the user 150 has reacted to the one or more audio samples 501.

In some implementations, if the context information 421 indicates that the user 150 has not reacted to the one or more audio samples 501, the interruption and reaction handler 520 generates instructions for modifying the media currently being presented to the user 150 optionally based on the coordinates 505 for the one or more audio samples 501. In some implementations, if the context information 421 indicates that the user 150 has reacted to the one or more audio samples 501, the interruption and reaction handler 520 forgoes generating instructions for modifying the media currently being presented to the user 150.

According to some implementations, the content manager 620 obtains the instructions for modifying the media currently being presented to the user 150 (e.g., the A/V content, the XR content, or the XR environment 128) from the interruption and reaction handler 520. In some implementations, the content manager 620 directs one or more of the feedback engine 628, the rendering engine 650, and the audio handling engine 680 to perform and/or cause performance of the instructions for modifying the media currently being presented to the user 150.

For example, the instructions for modifying the media currently being presented to the user 150 may include one or more of: ducking (e.g., reducing) the volume associated with the media currently being presented to the user 150, changing spatial audio characteristics associated with the media currently being presented to the user 150 (e.g., directional ducking such as changing an origin location or auto-panning of the audio associated with the media currently being presented to the user 150), providing a visual notification associated with the one or more audio samples 501 overlaid on the media currently being presented to the user 150, blurring or otherwise masking the media currently being presented to the user 150, providing a directional visual indicator overlaid on the media currently being presented to the user 150 based on the coordinates 505 of the one or more audio samples, providing haptic feedback, or the like.

Figure 7:
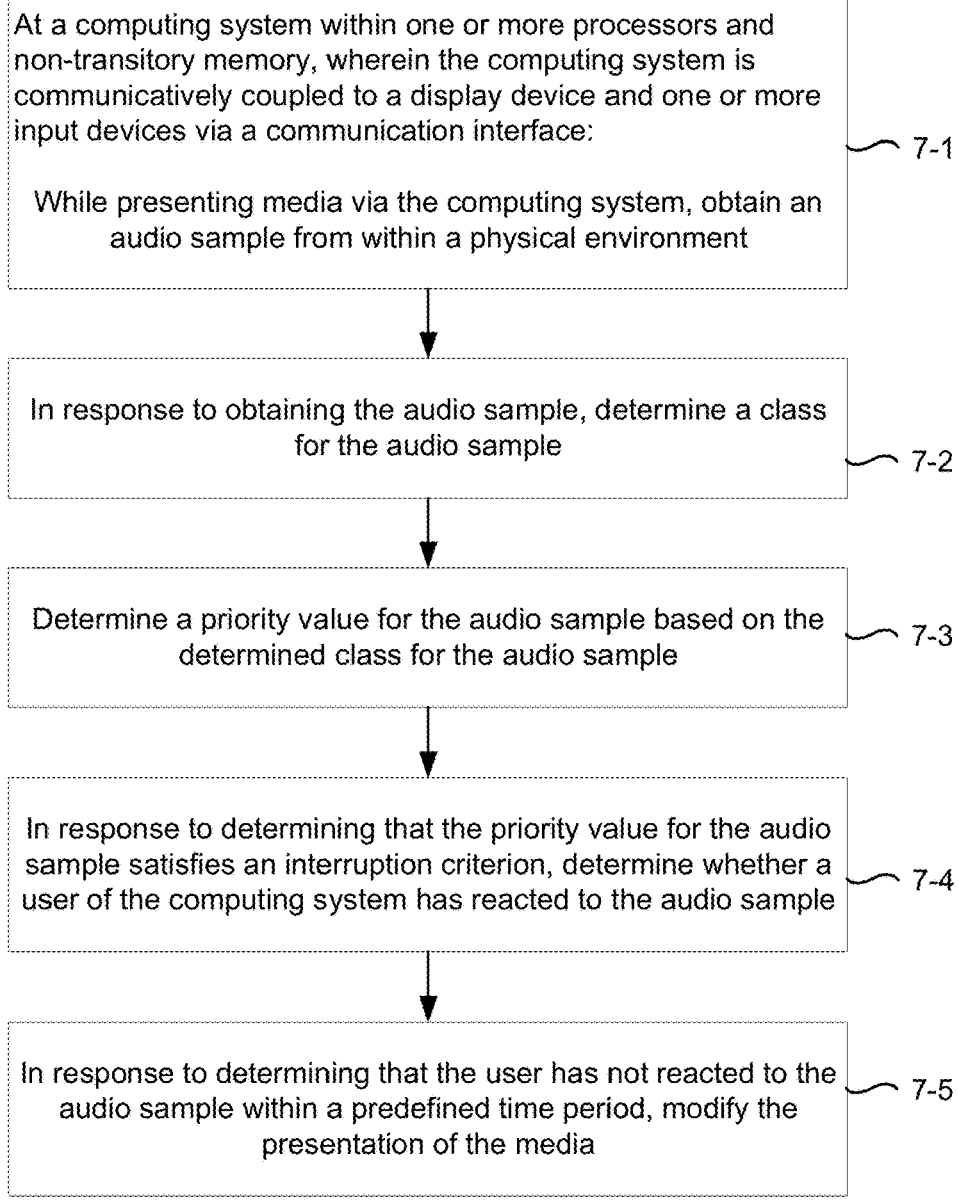
FIG. 7 is a flowchart representation of a method of interrupting media playback in accordance with some implementations.

FIG. 7 is a flowchart representation of a method 700 of interrupting media playback in accordance with some implementations. In various implementations, the method 700 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the computing system includes the interruption handling architecture 500 in FIG. 5 and/or the runtime architecture 600 in FIG. 6. In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As discussed above, while consuming media content, such as watching a movie or listening to music, a user may have difficulty hearing a doorbell, a baby's cry, or the like. However, interrupting the media content for every sound would be detrimental to the user experience. To this end, the computing system modifies the media content when a sound that satisfies an interruption criterion is detected and a user of the computing system has not reacted to the sound within a predefined time period.

As represented by block 7-1, while presenting media via the computing system, the method 700 includes obtaining (e.g., receiving, retrieving, detecting, capturing, or the like) an audio sample from within a physical environment. For example, with reference to FIG. 5, the one or more microphones 314 capture one or more audio samples 501 within the physical environment 105 such as ambient sounds, audible utterances or speech content, or the like. For example, with reference to FIG. 6, the content manager 620 manages and updates the media playback such as the A/V content, the XR content, the XR environment 128, or the like. With continued reference to FIG. 6, the presenter 670 presents the visual portion of the media via the one or more displays 312 and the audio portion of the media via the one or more speakers 316. For example, the media corresponds to audio content, video content, an XR environment, or the like. In some implementations, the computing system or a component thereof (e.g., the localizer 504 in FIG. 5) localizes the audio sample with absolute coordinates or coordinates relative to the current physical environment using an array of multiple microphones.

As represented by block 7-2, in response to obtaining the audio sample, the method 700 includes determining a class for the audio sample. In some implementations, the computing system performs a pattern/signature matching algorithm to provide a semantic label or class for the audio sample. For example, with reference to FIG. 5, the classifier 502 generates class information 503 (e.g., a semantic label) for the one or more audio samples 501 by matching the one or more audio samples 501 against an audio signatures library 505 including a plurality of known audio signatures and associated classes or semantic labels. One of ordinary skill in the art will appreciate that, in various other implementations, the classifier 502 may be replaced with a natural language processor, a machine learning engine (e.g., a neural network, state vector machine, or the like), or the like.

As represented by block 7-3, the method 700 includes determining a priority value for the audio sample based on the determined class for the audio sample. In some implementations, the computing system determines the priority value for the audio sample based on predetermined values for the classes. For example, default priority values are associated with classes by a developer, user, user preferences, crowd-sourced data, or the like.

For example, with reference to FIG. 5, the value assigner 506 determines a priority value 507 for the one or more audio samples 501 based on the class information 502 and a class-value table 509 including a plurality of predefined priority values for various classes of audio content. One of ordinary skill in the art will appreciate that the class-value table 509 may be modified and/or varied, in various implementations, based on user preferences, manual tuning inputs, crowd-sourced data, and/or the like.

As represented by block 7-4, in response to determining that the priority value for the audio sample satisfies an interruption criterion, the method 700 includes determining whether a user of the computing system has reacted to the audio sample. In some implementations, the interruption criterion includes a list of important sound classes set by the user of the computing system. In some implementations, the interruption criterion includes a preset list of important sound classes. For example, the list of important sound classes associated with priority values that satisfy the interruption criterion may include one or more of a baby crying, a dog barking, a doorbell, a specific audible utterance or command such as "help" or "hey, dad", an audible sound above a threshold decibel level, an audible utterance above a threshold decibel level such as a shout, glass breakage, a crashing sound above a threshold decibel level, a security alarm, a fire alarm, a ringtone, or the like. In some implementations, in response to determining that the priority value for the audio sample does not satisfy the interruption criterion, the method 700 includes forgoing determining whether a user of the computing system has reacted to the audio sample and forgoing modifying the presentation of the media.

For example, with reference to FIG. 5, if the priority value 507 for the one or more audio samples 501 satisfies an interruption criterion, the interruption and reaction handler 520 determines whether the context information 421 (e.g., including a motion state, a gaze direction, head pose information, body pose information, extremity tracking information, and/or the like for the user 150) indicates that the user 150 has reacted to the one or more audio samples 501. For example, the priority value 507 for the one or more audio samples 501 satisfies the interruption criterion when the priority value 507 breaches or exceeds a deterministic or non-deterministic interruption threshold value. In this example, the computing system may set the interruption threshold value based on the media currently being presented to the user 150, a focus metric associated with how immersed or focused the user 150 is on the media, a user input, and/or the like.

As represented by block 7-5, in response to determining that the user has not reacted to the audio sample within a predefined time period, the method 700 includes modifying the presentation of the media. For example, the predefined time period corresponds to a deterministic or non-deterministic amount of time. In this example, the computing system may set the predefined time period based on the media currently being presented to the user 150, a focus metric associated with how immersed or focused the user 150 is with respect to the media, the class for the audio sample, a user input, and/or the like. According to some implementations, the computing system breaks the user's immersion with the media by at least one of providing a visual notification associated with the audio sample, providing a directional visual notification associated with the audio sample, providing a visual treatment to the media to deemphasize the media (e.g., blurring), pausing the media, providing haptic feedback, reducing the volume of the media, changing spatial audio characteristics for the media, or the like.

In some implementations, modifying the presentation of the media includes reducing a volume of the media playback. In some implementations, reducing the volume of the media playback includes differential volume ducking to account for an imbalance in hearing acuity of the user of the computing system. In some implementations, modifying the presentation of the media includes changing spatial audio characteristics associated with the media playback. In some implementations, changing spatial audio characteristics associated with the media playback includes directional ducking by at least one of moving a location of a source for an audio portion of the media playback based on a location of the audio sample or panning the audio portion of the media playback based on the location of the audio sample.

In some implementations, modifying the presentation of the media includes blurring a visual portion of the media playback and overlaying a notification indicative of the audio sample. In some implementations, modifying the presentation of the media includes overlaying a directional notification indicative of a direction of the audio sample based on the location of the audio sample. In some implementations, the modification to the presentation of the media is coupled with at least one of visual, audible, or haptic feedback.

For example, with reference to FIG. 5, if the context information 421 indicates that the user 150 has not reacted to the one or more audio samples 501, the interruption and reaction handler 520 generates instructions for modifying the media currently being presented to the user 150 optionally based on the coordinates 505 for the one or more audio samples 501. Continuing with this example, with reference to FIG. 6, the content manager 620 obtains the instructions for modifying the media currently being presented to the user 150 (e.g., the A/V content, the XR content, or the XR environment 128) from the interruption and reaction handler 520. In some implementations, the content manager 620 directs one or more of the feedback engine 628, the rendering engine 650, and the audio handling engine 680 to perform and/or cause performance of the instructions for modifying the media currently being presented to the user 150.

For example, the instructions for modifying the media currently being presented to the user 150 may include one or more of: ducking (e.g., reducing) the volume associated with the media currently being presented to the user 150, changing spatial audio characteristics associated with the media currently being presented to the user 150 (e.g., directional ducking such as changing an origin location or panning of the audio associated with the media currently being presented to the user 150), providing a visual notification associated with the one or more audio samples 501 overlaid on the media currently being presented to the user 150, blurring or otherwise masking the media currently being presented to the user 150, providing a directional visual indicator overlaid on the media currently being presented to the user 150 based on the coordinates 505 of the one or more audio samples, providing haptic feedback, or the like.

In some implementations, in response to determining that the user has reacted to the audio sample within the predefined time period, the method 700 includes forgoing modifying the presentation of the media. In some implementations, the user reaction to the audio sample within the predefined time period includes at least one of walking towards the audio sample, turning head towards the audio sample, gazing towards the audio sample, verbally acknowledging the audio sample, or gesturing towards the audio sample.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first item could be termed a second item, and, similarly, a second item could be termed a first item, which changing the meaning of the description, so long as the occurrences of the "first item" are renamed consistently and the occurrences of the "second item" are renamed consistently. The first item and the second item are both items, but they are not the same item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a computing system including non-transitory memory and one or more processors, wherein the computing system is communicatively coupled to a display device and one or more input devices:
      while presenting media via the computing system, obtaining an audio sample from within a physical environment;
      in response to obtaining the audio sample, determining a class for the audio sample;
      determining a priority value for the audio sample based on the determined class for the audio sample;
      in response to determining that the priority value for the audio sample satisfies an interruption criterion, determining whether a user of the computing system has reacted to the audio sample; and
      in response to determining that the user has not reacted to the audio sample within a predefined time period, modifying the presentation of the media.

2. The method of claim 1, further comprising:
   in response to determining that the priority value for the audio sample does not satisfy the interruption criterion, forgoing determining whether a user of the computing system has reacted to the audio sample and forgoing modifying the presentation of the media.

3. The method of claim 1, further comprising:
   in response to determining that the user has reacted to the audio sample within the predefined time period, forgoing modifying the presentation of the media.

4. The method of claim 1 wherein modifying the presentation of the media includes reducing a volume of the media playback.

5. The method of claim 4, wherein reducing the volume of the media playback includes differential volume ducking to account for an imbalance in hearing acuity of the user of the computing system.

6. The method of claim 1, wherein modifying the presentation of the media includes changing spatial audio characteristics associated with the media playback.

7. The method of claim 6, wherein changing spatial audio characteristics associated with the media playback includes directional ducking by at least one of moving a location of a source for an audio portion of the media playback based on a location of the audio sample or auto-panning the audio portion of the media playback based on the location of the audio sample.

8. The method of claim 1, wherein modifying the presentation of the media includes blurring a visual portion of the media playback and overlaying a notification indicative of the audio sample.

9. The method of claim 1, wherein modifying the presentation of the media includes overlaying a directional notification indicative of a direction of the audio sample.

10. The method claim 1, wherein the modification to the presentation of the media is coupled with at least one of visual, audible, or haptic feedback.

11. The method claim 1, wherein the interruption criterion includes a list of important sound classes set by the user of the computing system.

12. The method of claim 1, wherein the interruption criterion includes a preset list of important sound classes.

13. The method of claim 1, wherein the user reaction to the audio sample within the predefined time period includes at least one of walking towards the audio sample, turning head towards the audio sample, gazing towards the audio sample, verbally acknowledging the audio sample, or gesturing towards the audio sample.

14. A device comprising:
   one or more processors;
   a non-transitory memory;
   an interface for communicating with a display device and one or more input devices; and
   one or more programs stored in the non-transitory memory, which, when executed by the one or more processors, cause the device to perform operations comprising:
      while presenting media via the device, obtaining an audio sample from within a physical environment;
      in response to obtaining the audio sample, determining a class for the audio sample;
      determining a priority value for the audio sample based on the determined class for the audio sample;
      in response to determining that the priority value for the audio sample satisfies an interruption criterion, determining whether a user of the device has reacted to the audio sample; and
      in response to determining that the user has not reacted to the audio sample within a predefined time period, modifying the presentation of the media.

15. The device of claim 14, wherein the one or more programs cause the device to perform further operations comprising, in response to determining that the user has reacted to the audio sample within the predefined time period, forgoing modifying the presentation of the media.

16. The device of claim 14, wherein modifying the presentation of the media includes reducing a volume of the media playback.

17. The device of claim 16, wherein reducing the volume of the media playback includes differential volume ducking to account for an imbalance in hearing acuity of the user of the device.

18. The device of claim 14, wherein modifying the presentation of the media includes changing spatial audio characteristics associated with the media playback.

19. The device of claim 18, wherein changing spatial audio characteristics associated with the media playback includes directional ducking by at least one of moving a location of a source for an audio portion of the media playback based on a location of the audio sample or auto-panning the audio portion of the media playback based on the location of the audio sample.

20. A non-transitory memory storing one or more programs, which, when executed by one or more processors of a device with an interface for communicating with a display device and one or more input devices, cause the device to:
- while presenting media via the device, obtain an audio sample from within a physical environment;
- in response to obtaining the audio sample, determine a class for the audio sample;
- determine a priority value for the audio sample based on the determined class for the audio sample;
- in response to determining that the priority value for the audio sample satisfies an interruption criterion, determine whether a user of the device has reacted to the audio sample; and
- in response to determining that the user has not reacted to the audio sample within a predefined time period, modify the presentation of the media.

* * * * *